United States Patent [19]
Rumocki

[11] Patent Number: 5,426,866
[45] Date of Patent: Jun. 27, 1995

[54] METHOD AND APPARATUS FOR DEWATERING OF SLUDGES

[75] Inventor: Andrzej Rumocki, Aleksandrow/Lodz, Poland

[73] Assignee: Lucia Baumann-Schilp, Wörthsee, Germany

[21] Appl. No.: 167,974

[22] PCT Filed: Jun. 24, 1992

[86] PCT No.: PCT/EP92/01426

§ 371 Date: Dec. 27, 1993

§ 102(e) Date: Dec. 27, 1993

[87] PCT Pub. No.: WO93/00562

PCT Pub. Date: Jan. 7, 1993

[30] Foreign Application Priority Data

Jun. 25, 1991 [DE] Germany ............ 41 20 959.1

[51] Int. Cl.⁶ .................................. F26B 5/08
[52] U.S. Cl. ............................. 34/321; 34/58; 210/609; 210/771
[58] Field of Search ............... 34/312, 314, 315, 321, 34/58, 397, 69; 110/221; 210/770, 771, 609

[56] References Cited

U.S. PATENT DOCUMENTS

| | | | |
|---|---|---|---|
| 3,319,587 | 5/1967 | Albertson et al. | 110/221 |
| 3,580,193 | 5/1971 | Logan | 110/221 |
| 3,724,091 | 4/1973 | Rousselet . | |
| 4,330,411 | 5/1982 | Florin et al. | 34/387 |

FOREIGN PATENT DOCUMENTS

| | | |
|---|---|---|
| 305212 | 2/1973 | Austria . |
| 668849 | 11/1935 | Germany . |
| 1432864 | 12/1968 | Germany . |
| 3630920 | 4/1988 | Germany . |
| 3915082 | 9/1990 | Germany . |
| 148212 | 9/1931 | Switzerland . |
| 655786 | 5/1986 | Switzerland . |
| 134966 | 11/1919 | United Kingdom . |

Primary Examiner—Denise L. Gromada
Attorney, Agent, or Firm—Spencer, Frank & Schneider

[57] ABSTRACT

In order to considerably reduce expenditures for the dewatering of sludges, particularly from sewage treatment facilities, and thereby perform the step from a sticky, wet solid to a flowable solid granulate practically without the re-admixture of material, it is proposed to employ a solid bowl sludge centrifuge as the dispersing member in a subsequently connected convection dryer for further dewatering of the wet solids particles that are ejected with a dry substance content of approximately 25-35 weight percent. The wet solids particles that are ejected at high speed in the form of a film of particles from the outlet of the solid bowl sludge centrifuge are surrounded by the hot drying gas while still on their trajectory and are pre-dried to a dry substance content of approximately 65 weight percent (FIG. 5).

48 Claims, 11 Drawing Sheets

METHOD AND APPARATUS FOR DEWATERING OF SLUDGES

The invention relates to a method and to an apparatus for dewatering sludges, particularly from sewage treatment facilities, as defined in the preamble of independent claim 1 and 21. Methods and apparatus of this type are known to be in public use.

In prior art methods for dewatering sewage sludge, the sludge is dewatered mechanically by means of a solid bowl screw centrifuge, a chamber filter press or a traveling screen press to about 25 to 35 weight percent of dry substance content. In order to be able to dry the resulting wet and sticky solid matter that is baked together into lumps to, for example, 90 weight percent dry substance in a dryer, the solid matter lumps are pre-comminuted, according to DE 3,915,082.C1, are re-mixed with very large amounts of dry dust and granulated in order to overcome the so-called glue phase in the wet solid matter and to increase the dry substance content to about 60 weight percent. After coarse lumps have been screened out, the resulting solids are repeatedly intermediately stored and are fed in measured quantities into a contact dryer or convection dryer. In addition to the enormously increased amount of apparatus required, this manner of proceeding leads to the consequence that the drying system connected to the centrifuge outlet must process a quantity of material that is increased almost three to five times compared to the centrifuged quantity of wet solid matter, which results in a corresponding increase in the structural size of the drying system. Another drawback is that the increased amount of material requires the removal of all of the moisture at a very much lower moisture level and thus with a greatly reduced drying speed.

In German Patent 948,497, the still wet centrifuged solids that have been dewatered in a continuously operating screen centrifuge, for example a sliding screen centrifuge, a screw-type screen centrifuge or a solid bowl centrifuge, are dried further by employing a drying device that is operated with hot gas or hot steam and forms a structural unit with the centrifuge. In the case of the sliding centrifuge, the drying device is composed of a casing disposed between the discharge end of the centrifuge drum and the collecting chamber for the solids. At its end where it is connected to the centrifuge drum, the casing has an interior diameter that approximately corresponds to the exterior diameter of this drum and widens conically toward the end where it is connected with the collection chamber for the solids. Along its circumference, the casing is provided with a plurality of uniformly distributed, helically arranged openings that are parallel to the axis of the casing and through which hot air or hot steam is introduced by way of a distributor into the interior of the casing. The distributor is formed by an annular chamber between the conical casing and a cylindrical housing that surrounds the casing. The incoming hot air or hot steam conducts the solids expelled from the centrifuge chamber of the sliding centrifuge through the interior of the casing and thus dries them. The device according to German Patent 3,630,920 operates in a similar manner. It provides adjustable metal guide sheets within the drying device in addition to the air guidance. However, the prior art drying device is intended only for grainy, granulate-like solids which, after centrifuging, have only a slight residual moisture of about 10 to 15 weight percent. For wet solids from sludge centrifuges containing water in a proportion of 60 to 85 weight percent, the prior art drying device is neither intended nor suitable. Moreover, the diameter of the particles to be dewatered in the prior art drying device is predetermined and not a function of the apparatus parameters. In contrast thereto, the wet solids particles produced in sludge centrifuges depend in their size to a quite significant degree on the apparatus parameters, namely on the number of revolutions of the centrifuge, the exterior diameter of the discharge zone, the number and opening width of the discharge openings as well as the resulting degree of dewatering. Additionally, the wet solids particles from sludge centrifuges tend to lump together, in contrast to granular materials, since their moisture content of 60 to 85 weight percent is correspondingly high. Finally, in the prior art drying devices the drying gas flows essentially along the interior wall of the casing and would therefore grab the wet solids particles ejected by the centrifuge only shortly before they impact on the interior wall of the drum which would be insufficient for significant withdrawal of moisture from the wet solids particles.

It is the object of the invention to significantly reduce the expenditures for dewatering sludges, particularly sewage sludge, and perform the step from the sticky, wet solid matter to a flowable solid granulate practically without the re-admixture of any material.

This is accomplished according to the invention by the characterizing features of independent claims 1 and 21.

Advantageous features of the method according to the invention and of the apparatus according to the invention are defined in the dependent claims.

In order to convert as quickly as possible the wet solids, whose surface is still wet, from the solid bowl centrifuge employed according to the invention into a non-sticky, easily flowable solid by drying at a very high drying rate, the sticky wet solids must be comminuted into ultra-fine particles, which have a very high specific surface area, and must be exposed at high relative speed to a drying gas (hot gas or hot steam). This is accomplished according to the invention in that the wet solids particles which are ejected at high speed at the discharge end of the solid bowl centrifuge and have an average diameter in a range from 0.1 to 1 mm are surrounded by a drying gas at high speed while still on their trajectory and discharge the moisture on their surfaces before they impact on the walls of the centrifuge or a housing that surrounds the centrifuge or is disposed on its axial or radial extension.

The size of the sludge particles at the discharge for the wet solids in a solid bowl centrifuge is primarily dependent on the circumferential velocity of the centrifuge drum and on their velocity relative to the stream of drying gas. The average diameter of the wet solids particles becomes smaller, the greater both influential parameters are. As tests have shown, solid bowl screw centrifuges spray off the dewatered wet solids at a circumferential velocity of approximately 60 to 80 m/s. In solid bowl nozzle centrifuges, the discharge speed for the dewatered wet solids particles is about 100 m/s. The particle sizes developing at such ejection speeds have diameters that lie at about 0.5 mm. In the past, this formation of fine particles at the discharge end for wet solids in solid bowl centrifuges has not been utilized to dry the discharged wet solids.

In the prior art solid bowl centrifuges employed for the dewatering of sludge, the sprayed-off, wet solids particles collect in the housing surrounding the centrifuge in the form of large lumps which then, due to their own weight, drop into a discharge chute. In contrast thereto, the wet solids particles that have been ejected at a relatively high velocity from the discharge end of solid bowl centrifuges and are dispersed in finely granular form are further dewatered according to the invention near the discharge location by the addition of drying gas, so that a very high performance spray drying process can be realized which has a high, volume-related specific vaporization power and requires no additional atomizer device.

The advantages realizable with the invention are, in particular, that, instead of a plurality of apparatus and transporting devices for drying the sludge, a single, compactly constructed centrifuge spray dryer which has a very high specific separating output and overcomes the difficult drying sections of the glue phase without the re-admixture of additional substances. A possibly connected final dryer is thus greatly relieved with respect to the amount of moisture that it must evaporate. Another advantage is that already existing sludge centrifuges constructed in the form of solid bowl centrifuges can be retrofitted in the manner required by the present invention.

The invention is the first to utilize the advantageous dispersing characteristics of a solid bowl centrifuge (which is understood to mean a solid bowl screw centrifuge, a solid bowl nozzle centrifuge or a solid bowl centrifuge), as the sprayer so that according to the invention a sludge centrifuge now has two major functions instead of the sole separating function of the past. On the one hand, the mechanical separation of the wet solids from the suspension and, on the other hand, the dispersion and atomization of the separated wet solids into ultra-fine particles and their distribution and drying by means of a stream of drying gas. This second function, namely the advantageous utilization of the fine dispersion characteristics of the wet solids discharge from a sludge centrifuge constructed as a solid bowl centrifuge has not been used in industry in the past for the purpose of spray drying.

The invention and its further details and advantages will now be described in greater detail with reference to embodiments thereof that are illustrated in the drawings, in which.

Figure 5:
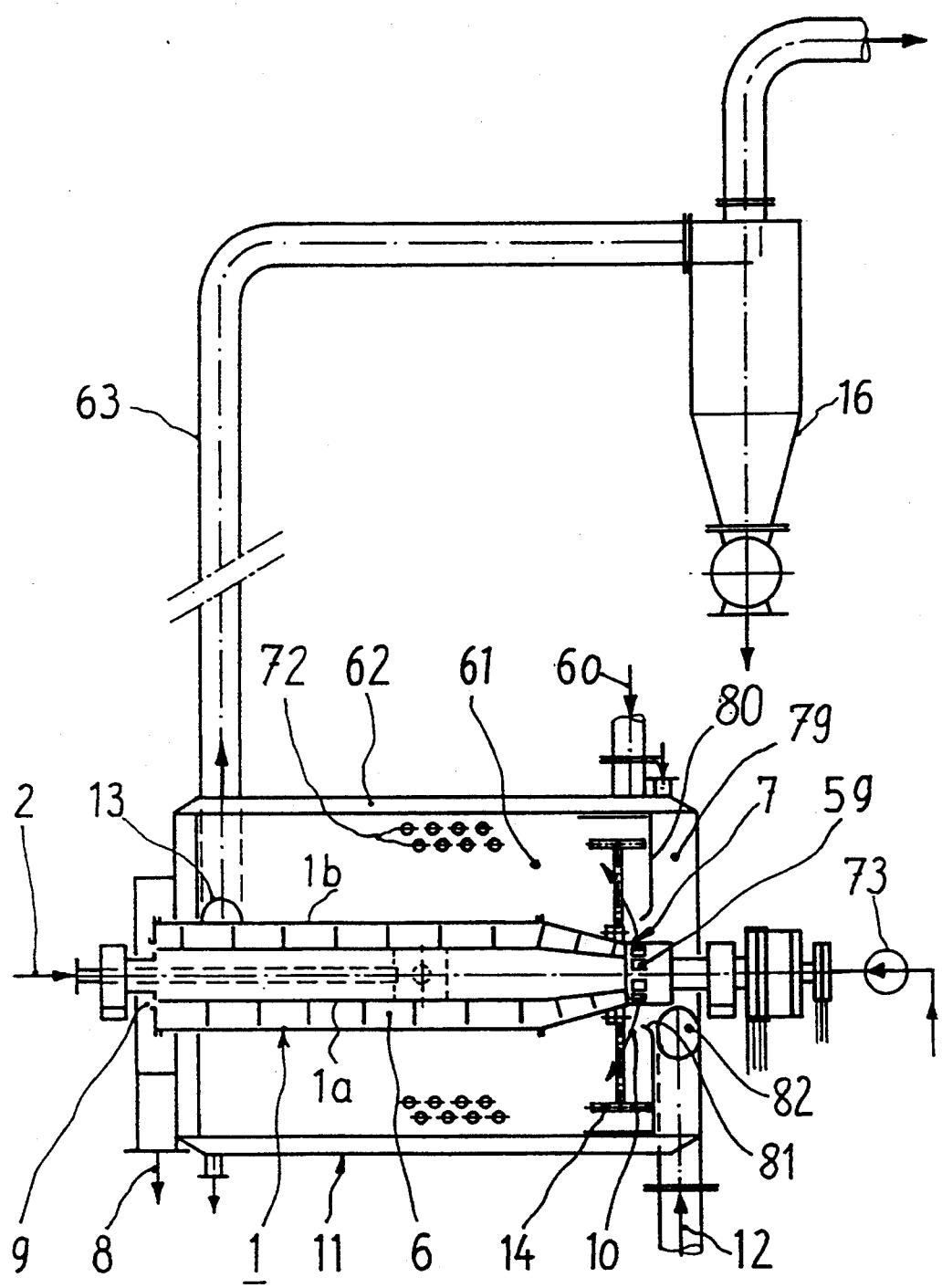
Figure 6:
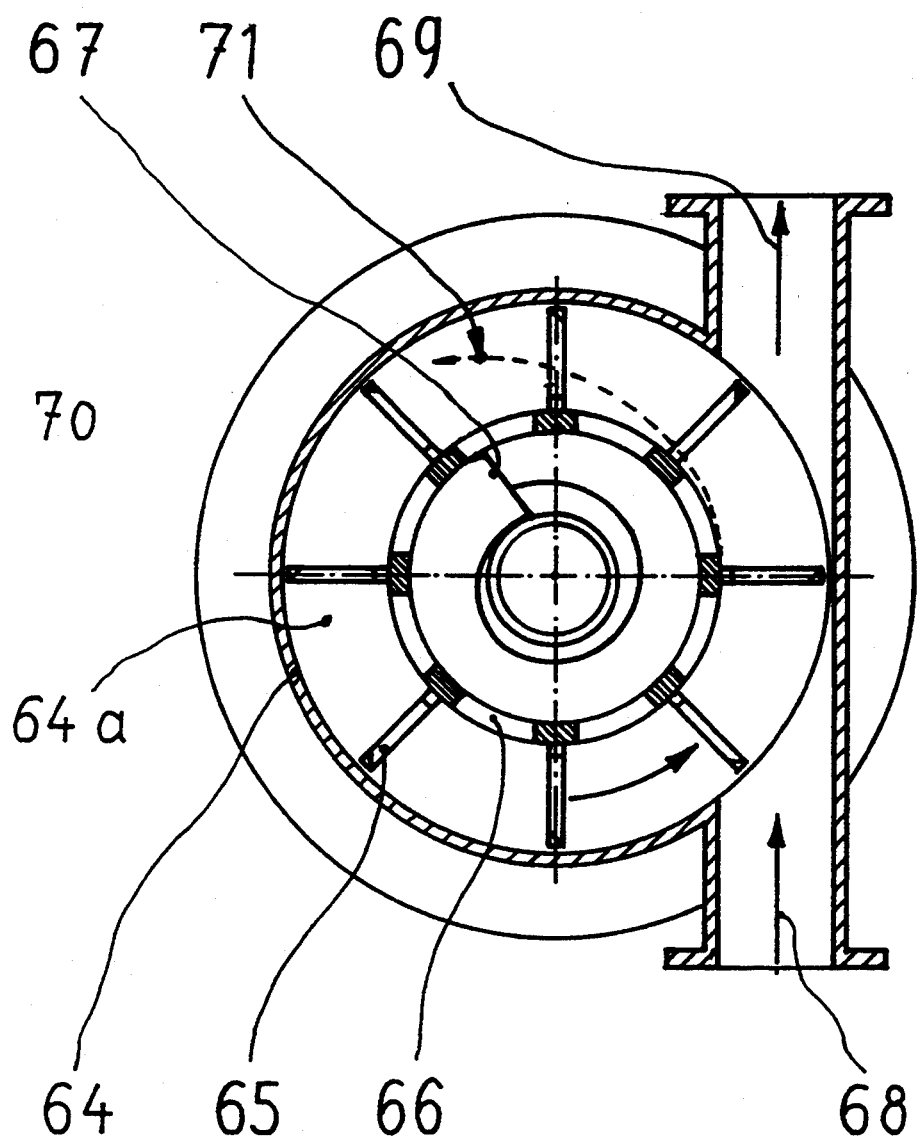
Figure 6A:
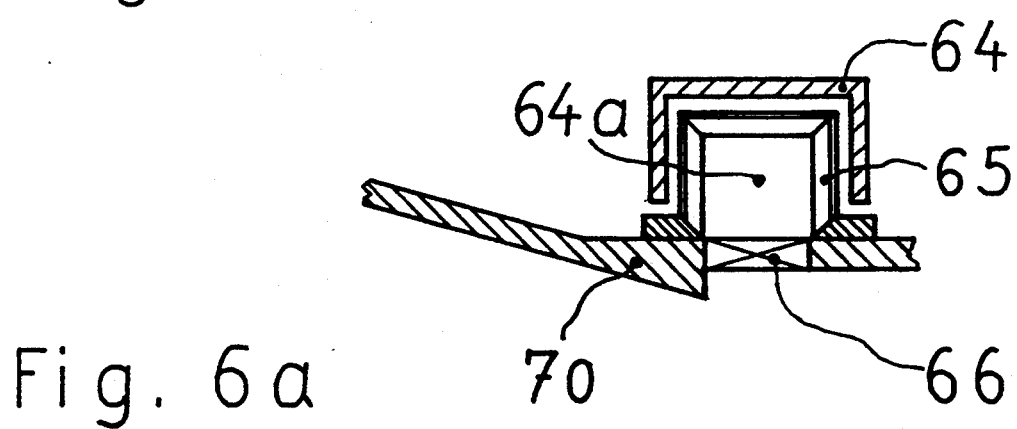
Figure 7:
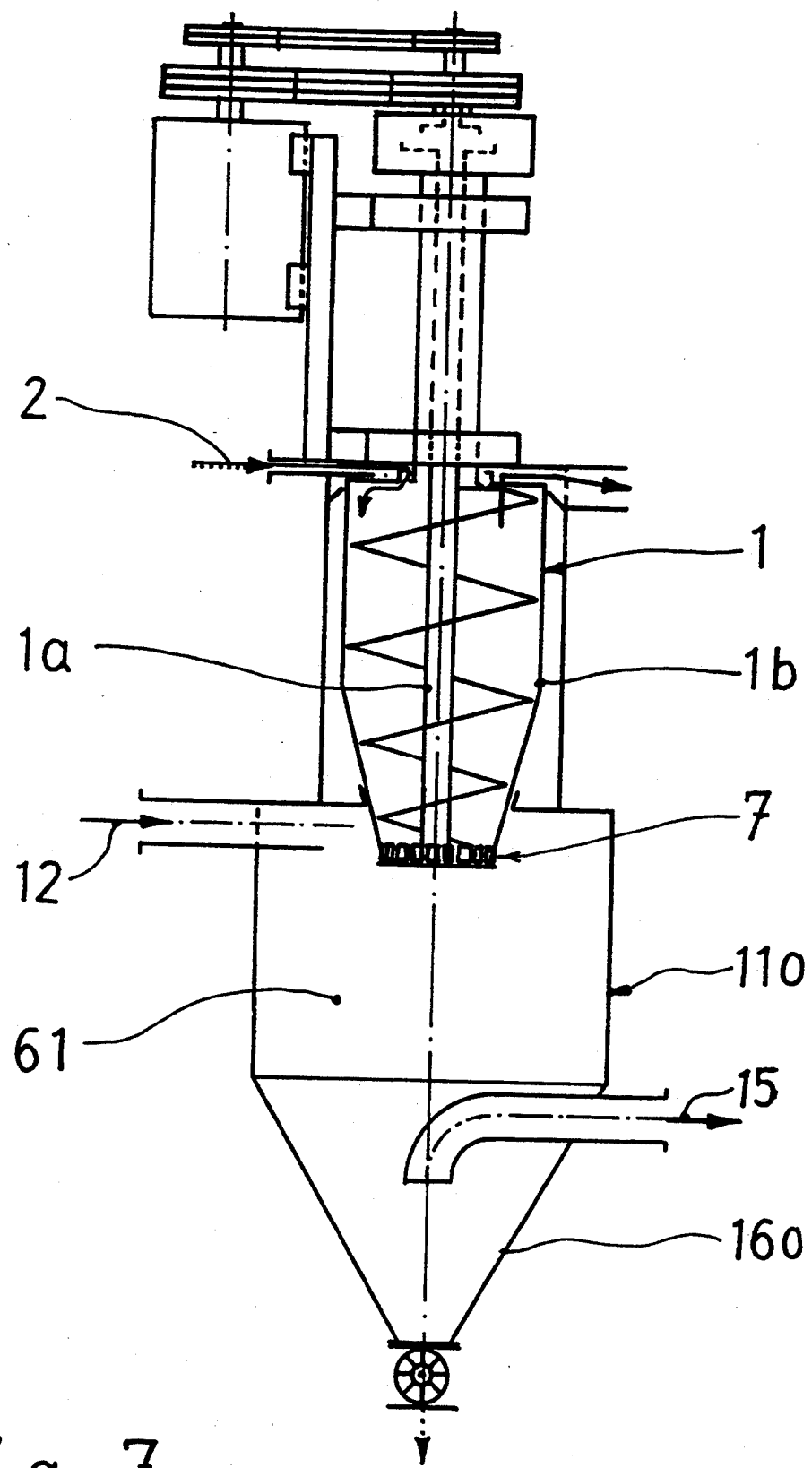
Figure 8:
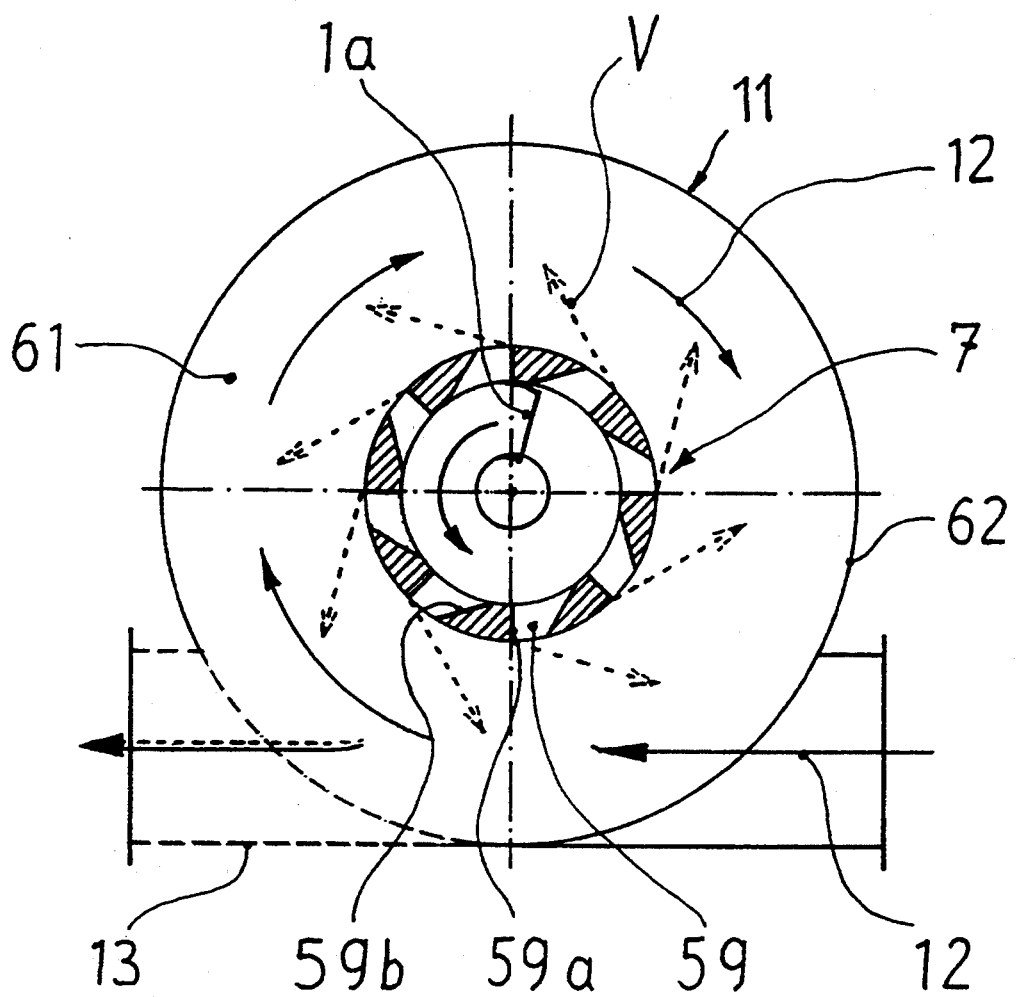
Figure 9:
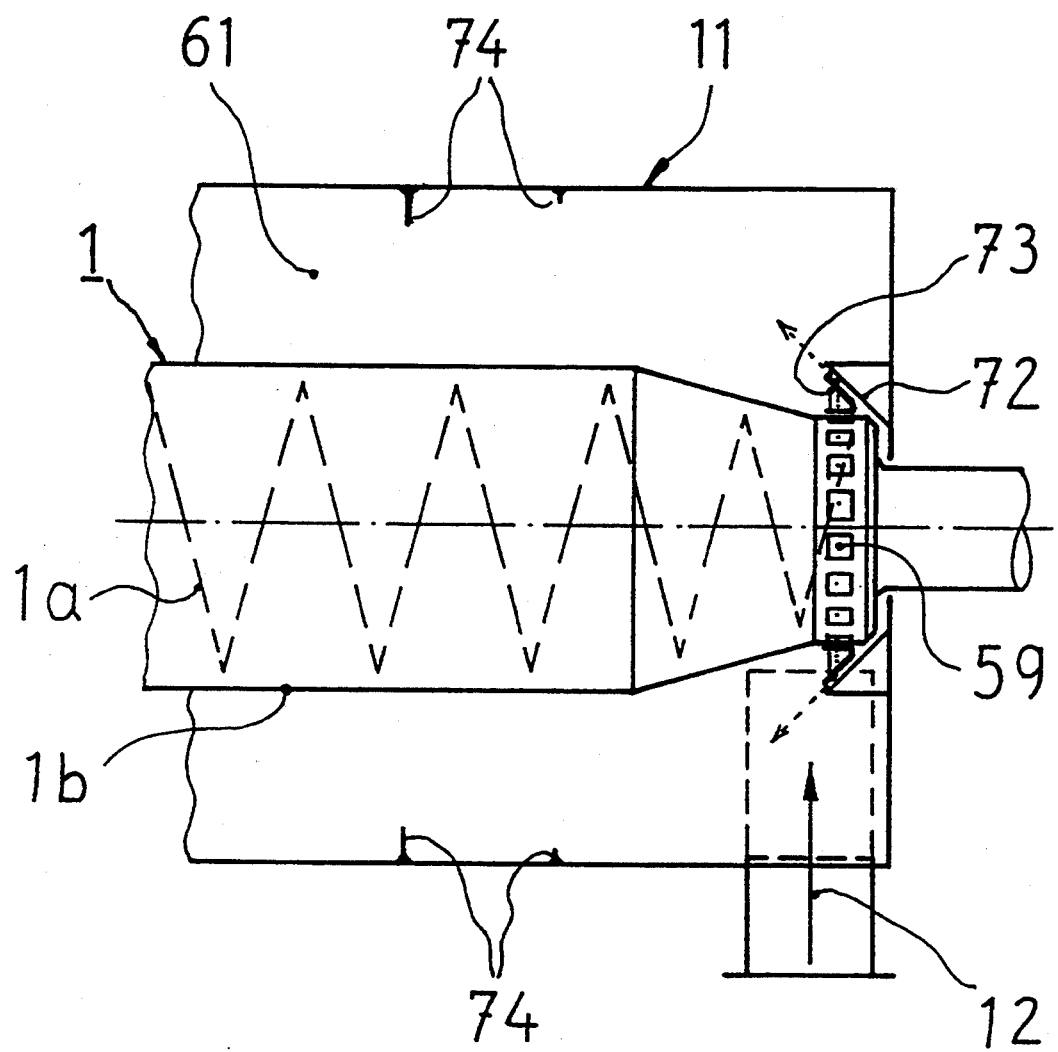
Figure 11:
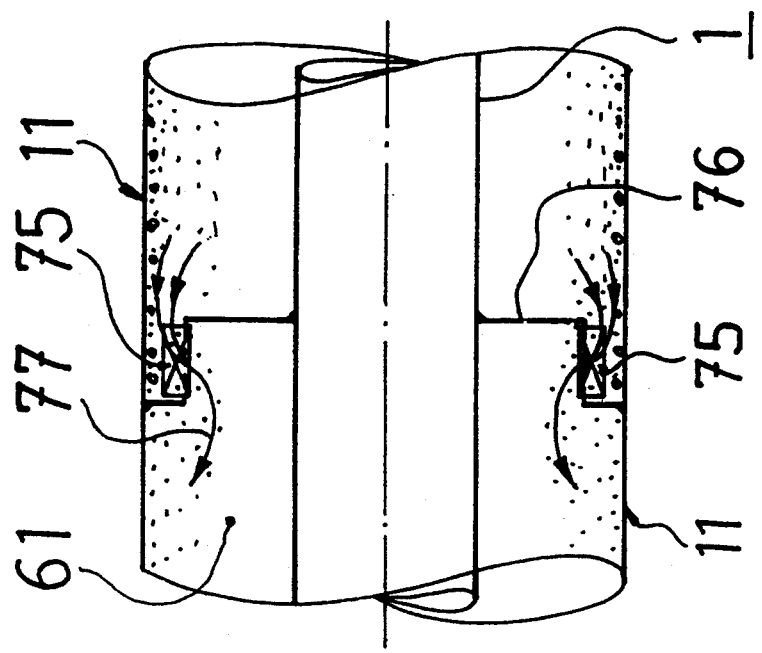
Figure 10:
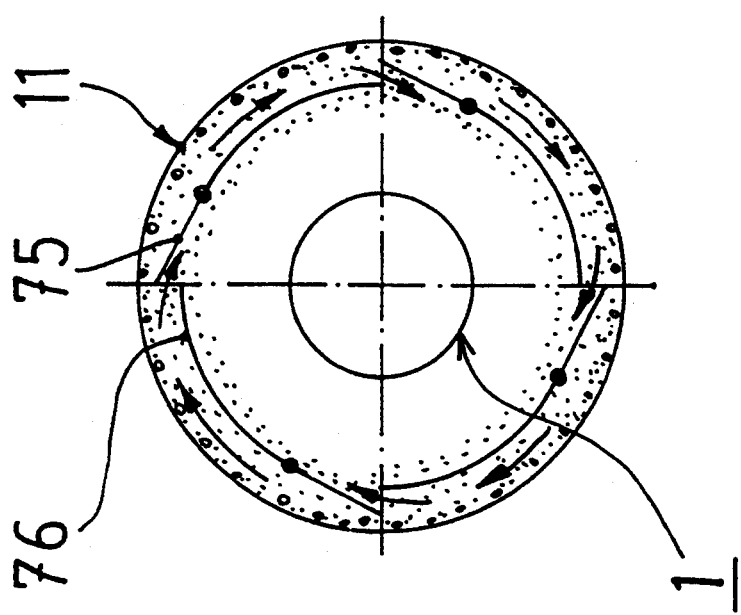

FIG. 5 is a schematic longitudinal sectional view of an embodiment of a dewatering device configured according to the invention that is composed of a solid bowl screw centrifuge, a discharge acting as an atomizer wheel for the wet solids, a housing equipped with heated walls and surrounding the centrifuge, a further inlet for secondary gas that is laden with fine dust for forming granules, a grinding and drying member, an pneumatic conveying dryer and a separating cyclone;

FIG. 6 is a cross-sectional view and FIG. 6a a partial longitudinal sectional view of an embodiment of a dewatering device according to the invention in the region of the discharge zone for the wet solids;

FIG. 7 is a schematic front view of an embodiment of an overhung mounted dewatering device according to the invention whose axis is in a vertical position, with a separating cyclone being integrated in its drying chamber;

FIG. 8 is a sectional view of the discharge zone of an embodiment of a dewatering device according to the invention which is equipped with specially configured discharge openings;

FIG. 9 is a front view of a further embodiment of a dewatering device according to the invention which is equipped with conical deflection surfaces for the film of solids in the immediate vicinity of the discharge openings and with retaining rings in the drying chamber for controlling the period of dwell of the wet solids particles;

FIG. 10 is a cross-sectional view of a further embodiment of a dewatering device according to the invention which is equipped with switches in the drying chamber for classification of the wet solids particles;

FIG. 11 is a longitudinal sectional view of the embodiment of FIG. 10; and

Figure 12:
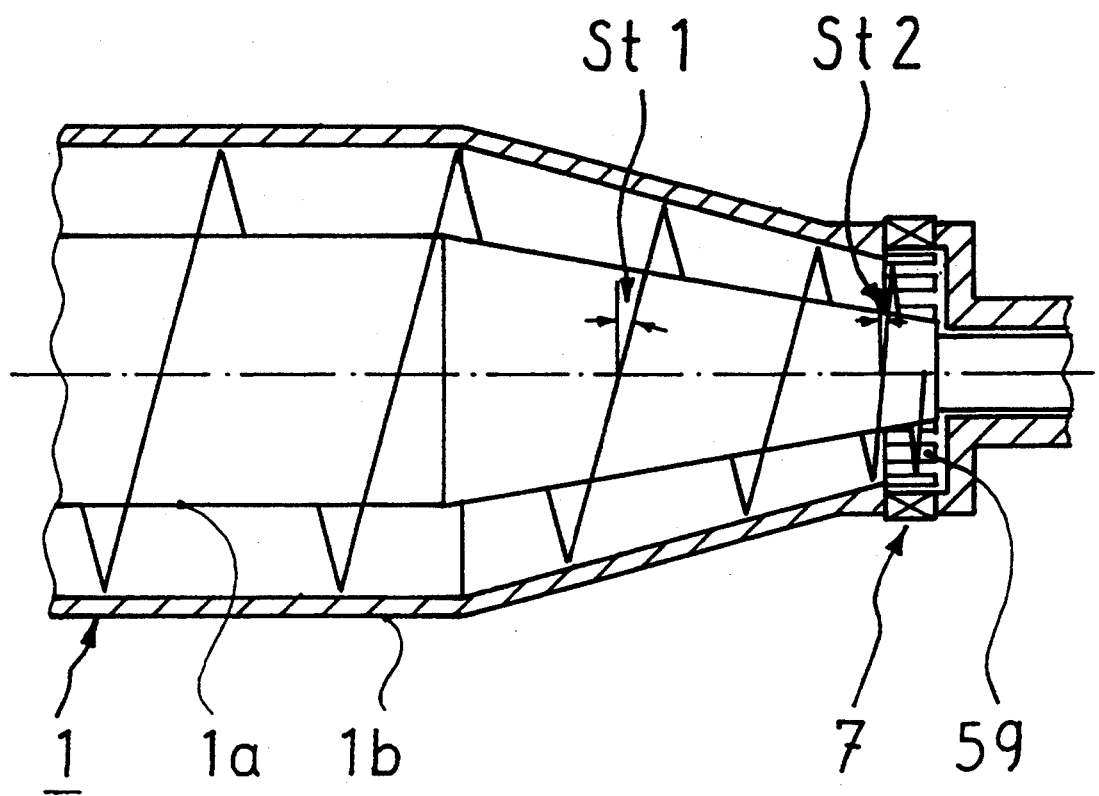

FIG. 12 is a longitudinal sectional view of the conical discharge end of a further embodiment of a dewatering device according to the invention which is equipped with a transporting screw whose turns have a reduced pitch upstream of the discharge edge for the wet solids.

Figure 1:
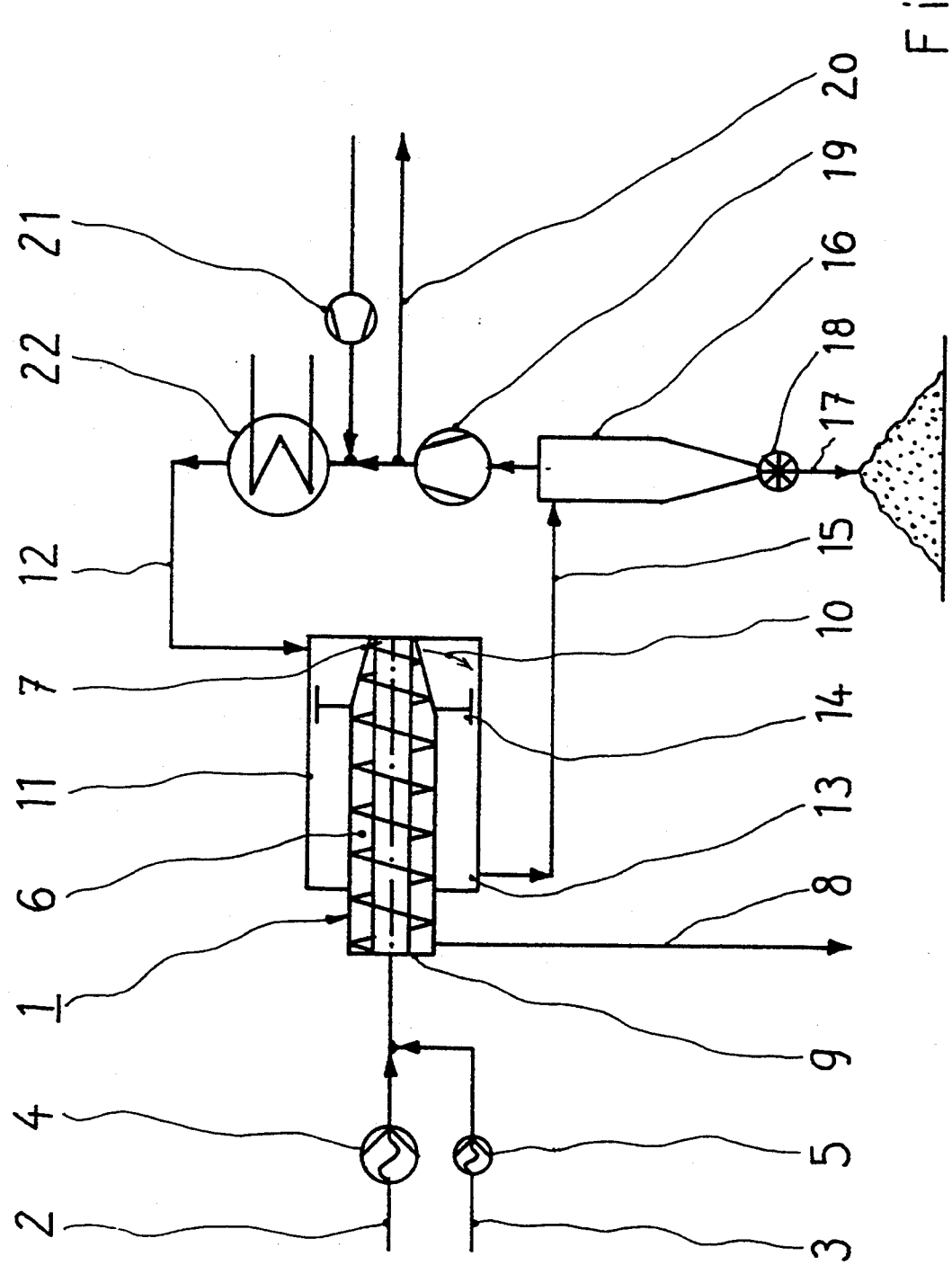
FIG. 1 is a schematic view of a dewatering and drying system operated in open circulation and employing a dewatering device constructed according to the invention and composed of a solid bowl screw centrifuge and a drying housing surrounding the centrifuge.

FIG. 1 depicts an embodiment of a system employing a dewatering device according to the invention that is operated with open drying gas circulation. The dewatering device comprises a solid bowl screw centrifuge 1 which includes, in a known manner, a rotatably mounted drum in which a rotating screw is mounted. Toward its axial discharge end, the drum is provided with a conical constriction and a discharge zone 7 provided with one or a plurality of discharge openings at the end of the constriction. The drum is driven at a slower speed than the screw but in the same direction of rotation, with the slight difference in numbers of revolution between the drum and the screw being adjustable at will and adapting itself corresponding to the charge of solids in the centrifuge. Drum and screw may be driven electrically or hydraulically, possibly with the use of gears. By means of pumps 4 and 5, the illustrated solid bowl screw centrifuge 1 receives sludge 2, for example sewage sludge, as well as a flocculating agent 3. The sludge is composed, for example, of 96 weight percent water and 4 weight percent solids, with the solids being flocculated by the flocculating agent (polyelectrolyte). The centrifugal force causes the suspended solids particles of the fed-in sludge 2 to be deposited at the drum walls in the clarification chamber 6 of centrifuge 1. The screw then transports the particles within the drum to the discharge openings of discharge zone 7 where they are expelled by the screw from the rotating drum at a speed of about 60 to 80 m/s as wet solids 10 in the form of particles that have a diameter in a range from about 0.1 to about 1 mm. The wet solids 10 are composed, for example, of about 35 weight percent solids and about 65 weight percent water. The separated centrifuged liquid 8 flows through return channels that are fastened to the screw body or directly through the screw channel in a direction opposite to the discharge direction of the solids back to the entrance side of the centrifuge and is dammed up by way of a weir 9 attached there. The centrifuged liquid 8 passing over weir 9 flows through a centrifuged liquid chute out of the rotating centrifuge drum. The discharged wet solids 10 are atomized into finely dispersed particles as a film of wet solids in a stationary housing 11 that surrounds the centrifuge drum. Fresh drying gas 12 at a temperature in a range between 150° and 500° C. flows, for example, in a tangential direction into housing 11, around the atomized film of wet solids and carries it, for example, in helical turns through the space between the rotating drum casing of centrifuge 1 and housing 11 until it leaves housing 11 at its tangential discharge end 13. On its way to discharge end 13, the dispersed wet solids 10 pass through a grinding zone 14 in which agglomerates are comminuted and broken up. Due to the simultaneous grinding and drying process in zone 14, deposits of wet solids particles at the walls of housing 11 are prevented and the drying speed, particularly of the larger dispersed wet solids particles, is increased considerably. For example, the water content of the wet solids particles can be reduced in this way to about 35 weight percent.

The drying gas 15 charged with pre-dried wet solids particles flows through a conduit to solids separator 16 which is configured as a cyclone, fiber filter or the like and is there separated into gas and bulk solids 17. The separated bulk solids 17 are composed of flowable solids and are discharged from separator 16 through a bucket wheel sluice 18, from where they are brought to a depository, a subsequently connected drying system, are incinerated or subjected to some other further treatment. The moist gas separated in solids separator 16 is compressed by means of an air circulating fan 19. By way of a switch that is not shown in detail, a portion 20 of the moist, compressed gas is taken from the gas circulation and is replaced by dry air with the aid of a fresh air fan 21. A heating register 22 or a burner raises the temperature of the air mixture back to the desired temperature of the hot drying gas 12 which is re-supplied to housing 11.

Figure 2:
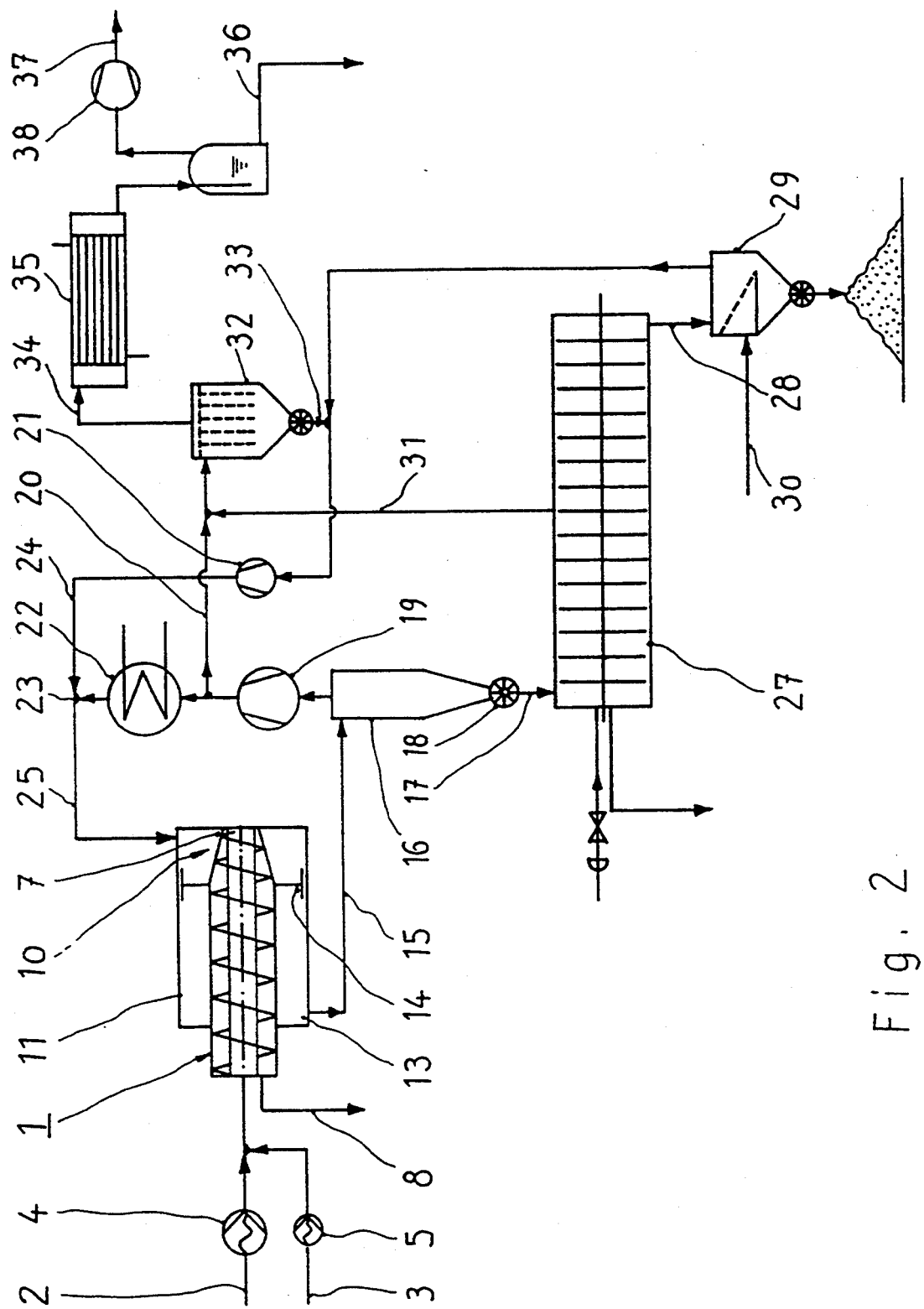
FIG. 2 is a schematic view of a dewatering and drying system operated with recirculated air and employing a dewatering device configured according to the invention as well as a subsequently connected long-term contact dryer.

FIG. 2 shows an embodiment of a system composed of a dewatering device according to the invention and a long-term contact dryer operating with recirculated air connected thereto. System components 1 to 11 are similar in function and configuration to those of FIG. 1. The drying gas 15 charged with pre-dried wet solids particles is freed of dust in a solids separator 16, is compressed as moist gas in air recirculating fan 19, is heated in heating register 22, mixed with dry fresh air 24 laden with fine dust in a mixer 23 and blown back into housing 11 at a high flow velocity as dust-laden hot drying gas 25. The ultra-fine dust in fresh air 24 envelops the dispersed, moist and sticky particles 10 of wet solids and reduces their tendency to bake to the walls of housing 11. The walls may additionally be cleaned by non-illustrated scraping or knocking tools. The pre-dried bulk solids 17 discharged from separator 16 are fed in measured quantities by way of bucket wheel sluice 18 into a long-term contact dryer 27 (configured, for example, as a contact tray dryer) and leave dryer 27 as a mixture 28 of granulate and dust containing, for example, 95 weight percent dry substance. In a subsequent pneumatic air jet screening unit 29, the dust of mixture 28 is carried along by the blown-through fresh air 30. Moreover, the vapors 31 extracted from dryer 27 also carry along ultra-fine dust. Vapors 31 together with the moist exhaust air 20 extracted downstream of air recirculating fan 19 are fed to a hose filter 32. The ultra-fine dust 33 filtered out in hose filter 32 is mixed into the dust laden fresh air at the outlet of air jet screening unit 29 and is fed by fan 21 as dry fresh air 24 that is laden with fine dust to the air circulating in mixer 23 and is heated in 22. The dust-free, moist exhaust air 34 at the outlet of hose filter 32 is condensed by cooling in cooler 35, with the resulting condensate 36 being returned to the sewage treatment facility and the dehumidified exhaust air 37 is extracted by means of a fan 38.

Figure 3:
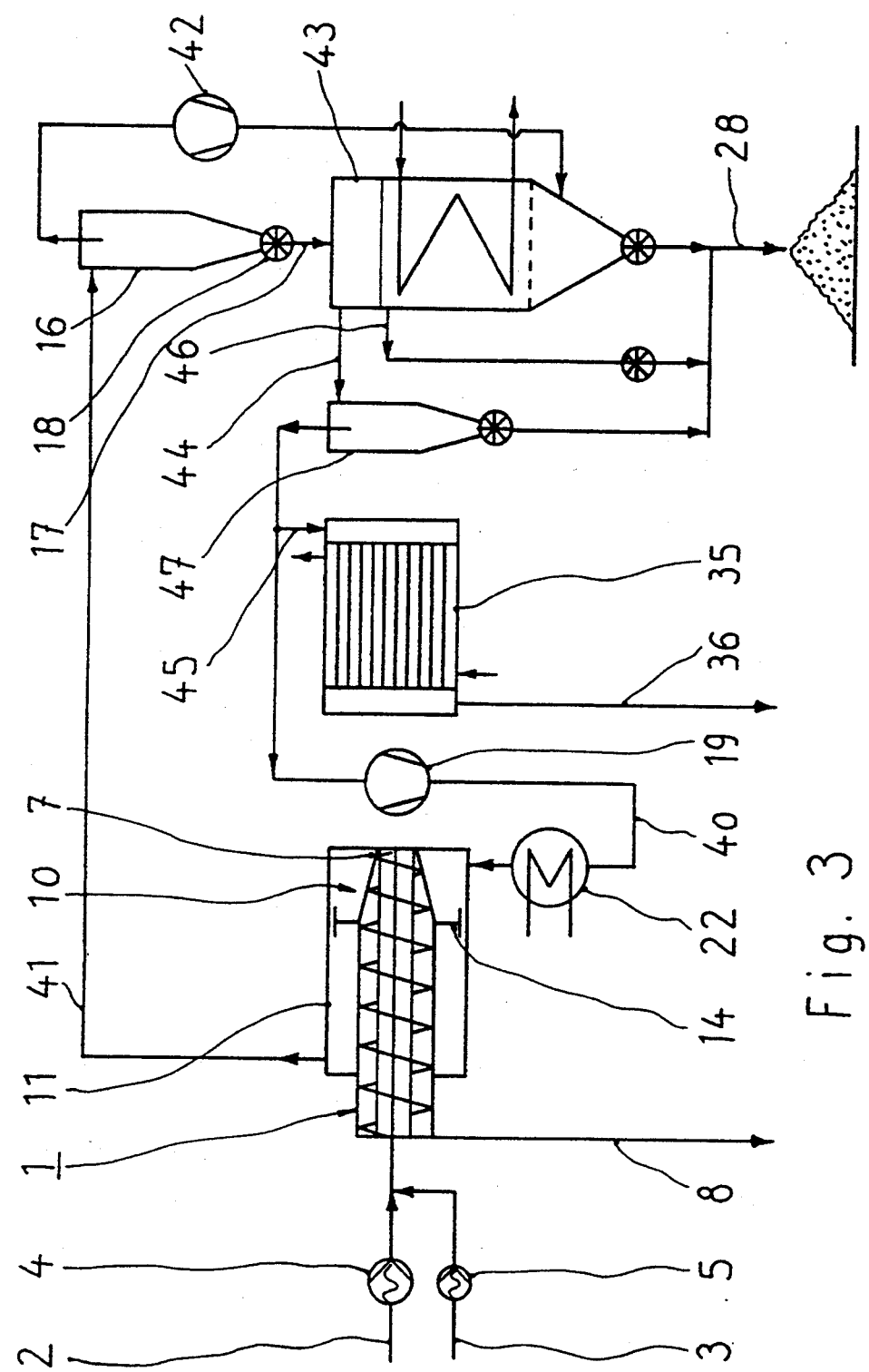
FIG. 3 is a schematic view of a dewatering and drying system operated with closed vapor circulation and employing a dewatering device configured according to the invention as well as a subsequently connected fluidized bed dryer.

FIG. 3 shows an embodiment of a system composed of a dewatering device according to the invention and a subsequently connected fluidized bed dryer 43 operating with closed vapor circulation. System components 1 to 11, 22 and 35 are similar to those of FIGS. 1 and 2. Instead of hot drying gas, superheated steam is circulated as the moisture absorbing medium. The steam 41 charged with pre-dried wet solids particles at the outlet of housing 11 is not yet saturated and is freed from dust in solids separator (cyclone) 16 and pressed by a fan 42 into fluidized bed dryer 43. The steam 44 exiting at the outlet of dryer 43 is almost saturated. The dust from saturated steam 44 is discharged in a dust removal cyclone 47. A portion 45 of the dust-free saturated steam is precipitated completely in a condenser 35 and is removed as condensate 36. The remainder 40 of saturated steam 44 is fed by fan 19 to heating register 22 which superheats the saturated steam to the temperature required for the fresh steam. The superheated fresh steam is then fed to housing 11. The pre-dried wet solids particles carried along by the steam at the outlet of housing 11 are discharged in separator 16 by way of bucket wheel sluice 18 and are steadily added to fluidized bed dryer 43 in measured quantities as pre-dried bulk solid crumbs 17 containing water in an amount of, for example, approximately 35 weight percent. After a longer period of dwell, the dried solids 28 leave fluidized bed dryer 43 through a solids overflow 46.

The combination of a dewatering device according to the invention with a subsequently connected fluidized bed dryer may also be operated with circulating inert gas or in an open circulation of fresh air/recirculated air.

Figure 4:
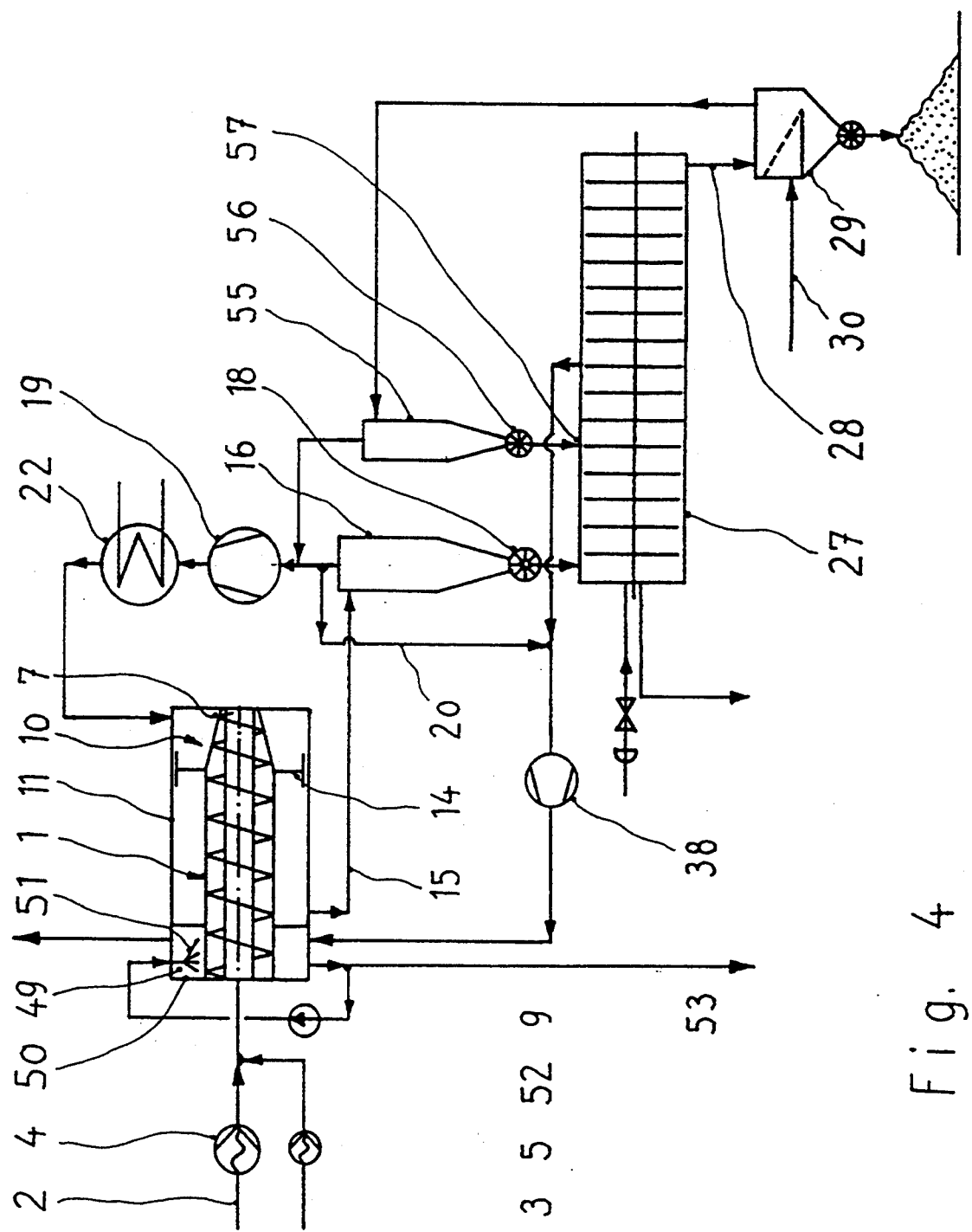
FIG. 4 is a schematic view of a further dewatering and drying system equipped with a dewatering device configured according to the invention, a subsequently connected contact dryer operating with the re-admixture of ultra-fine dust and washing of the exhaust air vapors in the centrifuged liquid discharge of the dewatering device.

FIG. 4 shows the scheme for a system of an embodiment including a dewatering device according to the invention in which the dispersed wet solids 10 are pre-dried in open recirculated air upstream of contact tray dryer 27. Compared to FIG. 2, the particularity of this embodiment is that the exhaust air 20 from solids separator 16 and contact tray dryer 27 is freed of residual dust and odorous substances by means of a vapor wash 49. As is evident from the structural principle of a solid bowl screw centrifuge discussed in connection with FIG. 1, because of the very high circumferential velocity of drum 1, the separated centrifuged liquid 9 from centrifuge 1 is sprayed out at the entrance side in the form of a screen of liquid mist, with this mist being very advantageously usable as a gas washer for the exhaust air in a suitable liquid housing 50. Although the quantities of sprayed-out centrifuged liquid 9 are very large, the sprayed-out centrifuged liquid quantities may be augmented by means of a circulating pump 52 or by the addition of process water in order to make the spray mist 51 more intense and to increase its cleaning power. The relatively solids-free centrifuged liquid 9 resulting from the liquid separation in the centrifuge is charged only slightly with washed-out dust and odorous substances from the exhaust air cleaning process and flows as contaminated liquid 53, for example, back into the non-illustrated sewage treatment facility. Similarly as in the case of FIG. 1, the drying gas 15 charged with wet solids particles is freed from dust in solids separator 16, is compressed as moist gas by air recirculating fan 19, is heated in heating register 22 and blown back into housing 11 as hot drying gas. The bulk solids discharged by bucket wheel sluice 18 are added, as in FIG. 2, in measured quantities to a long-term contact dryer 27 and leave dryer 27 as a mixture 28 of granulate and dust. The dry ultra-fine dust of mixture 28 carried along by the fresh air 30 in the subsequent air jet screening unit 29 is discharged in cyclone 55 and continuously added back to dryer 27 at a suitable location 57 by way of bucket wheel sluice 56. The dry exhaust air from cyclone 55 is mixed with the exhaust air of separator 16. A portion 20 of the exhaust air from separator 16 is mixed into the vapors extracted from dryer 27. The vapors enriched with air in this way are blown into liquid housing 50 by means of a fan 38 and are there freed of odorous substances as is the exhaust air 20 from separator 16. The remaining system components bear the same reference numerals and perform the same functions as described in connection with FIGS. 1 and 2. Instead of a tray dryer, any other suitable contact dryer may also be connected as dryer 27 to dewatering device 1, 11.

FIG. 5 is a schematic longitudinal sectional view of a dewatering device according to the invention. Components 1 to 14 are similar in function to the components bearing the same reference numerals in FIG. 1. Discharge zone 7 of centrifuge drum 1b at the axial, discharge end of transporting screw 1a has very many discharge openings 59, that is, a long discharge length, in order to keep the diameter of the dispersed wet solids particles as small as possible. The last turn of transporting screw 1a may here, as shown in detail in FIG. 12, be provided with a pitch St2 that is less than the remaining pitch St1, in order to extend the discharge length to almost the entire circumference of the rotating centrifuge drum 1b. In the sense of the highest possible circumferential speed for discharged quantities 59, the diameter of discharge zone 7 and its rate of rotation are selected to be as large as possible. Moreover, as shown in detail in FIG. 8, the non-accelerated edge 59b lying on the wind-sheltered side of discharge edge 59a of each discharge opening 59 may be sloped with respect to the centrifugal force vector V shown in dashed lines in order to prevent damming up of wet solids to be discharged at edge 59b. The flow of drying gas 12 which flows in drying chamber 61 essentially in the opposite direction to the wet solids particles ejected in the direction of centrifugal force vector V can be seen well in FIG. 8. To avoid overheating of the slide bearings disposed in the immediate vicinity of the mechanically and thermally highly stressed discharge zone 7 for transporting screw 1a as well as centrifuge drum 1b, cooling by means of a coolant pump 73 may be provided, as indicated in FIG. 5, to bring coolant axially to the rotating parts of device 1.

Dryer housing 11 is subdivided by a partition 80 into an intake chamber 79 and a drying chamber 61. Partition 80 has a circular opening 81 which lies approximately in the radial plane of discharge openings 59 and surrounds the latter while forming a narrow annular gap. Hot drying gas 12 is conducted through an inlet opening 82 into intake chamber 79 at a location in the vicinity of the mentioned annular gap and tangentially with respect to the end of centrifuge drum 1b projecting into intake chamber 70. Due to this tangential influx, the hot drying gas rotates in a helical movement within intake chamber 79 and flows through the mentioned annular gap in the axial direction (with respect to the axis of housing 11) into drying chamber 61 at a speed in a range between 20 and 60 m/s. Immediately adjacent to the mentioned annular gap, the dispersed wet solids particles are ejected in the form of a radially spreading umbrella and are gripped by the drying gas which moves helically in the axial direction, envelops them and deflects them from the radial plane of their path in the axial direction of housing 11. In this way, the ejected, dispersed wet solids particles encounter the hot drying gas transversely to their major direction of flight immediately after being ejected and are pre-dried while they are still on their trajectory. To influence the spin and the axial movement of the stream of drying gas in drying chamber 61, guide flaps or the like which are not illustrated may be provided in the influx region 79 of drying chamber 61.

The dispersed wet solids particles deflected from the radial path plane, traverse grinding members 14 that are fastened to centrifuge drum 1b and rotate rapidly together with drum 1b. Grinding members 14 as well as non-illustrated transporting and beater vanes (configured in the same manner as grinding members 14 and attached to the outer circumference of the rotating centrifuge drum) are able to destroy agglomerations of wet solids and in this way accelerate the removal of water in housing 11.

Since with larger particle diameters the drying gas 12 it not always able to effect a substantial deflection of the wet solids particles that were expelled at a high velocity, conical or bowl-shaped metal deflecting sheets 72 may be installed in the interior of housing 11, particularly in the immediate vicinity of the zone 7 where the wet solids are discharged, in order to further deflect the particle-shaped wet solids 10 in the axial direction as shown in FIG. 9. The wet solids particles 10 then impinge at a flat angle on these deflection sheets and bounce off them. In order to prevent deposits on these deflection sheets 72 and at critical locations at the interior wall of housing 11, rotating wall scrapers fastened to the rotating centrifuge drum or also vibrators and the like may be provided which are indicated in FIG. 9 by a rotating scraper 73 that is representative of all such possibilities and which is fastened on the centrifuge drum between discharge openings 59 so as to sweep at a close distance past metal deflection sheet 72 which is configured as a conical ring. To guide the direction of the dispersed wet solids particles, non-illustrated inlet openings for a secondary hot gas may be provided in housing 11 in axial distribution. Components of housing 11 that are exposed to abrasion may be lined with wear protection materials. In the vicinity of the umbrella of atomized particles 10 of wet solids, ultra-fine dust 60 may be blown in in order to granulate the dispersed particles 10 of wet solids. To further increase the performance of water evaporation in the interior 61 of housing 11, the housing walls 62 may be heated. In addition, heating surfaces 72 (FIG. 5) may be installed in interior 61. By way of built-in radial retaining rings 74, possibly of different radial lengths, at the interior wall of housing 11 (FIG. 9), a longer period of dwell may be enforced particularly for the largest particle agglomerations in the interior 61 of housing 11. Moreover, controllable switches equipped with movable axial flaps 75 and stationary radial retaining elements 76 (FIGS. 10 and 11) permit sorting by size of the particles in the interior of housing 11. This classifying effect is indicated in FIG. 11 by corresponding arrows 77 for the flow of the wet solids particles.

The pre-dried wet solids particles leave the interior 61 at 13 and travel over a conveying gas dryer 63, for example, a through-circulation dryer or the like, to discharge cyclone 16. In the case of the dewatering device arranged with its axis vertically as shown in FIG. 7, and with the solid bowl centrifuge 1 in an overhung mounting, a cyclone 160 is integrated in a spray dryer housing 110 which extends as an axial continuation of centrifuge 1, with the cyclone being configured as an axial continuation of housing 110. Compared to the centrifuge 1 arranged with its axis in the horizontal position and supported at both axial ends according to the embodiments of FIGS. 1 to 5, the embodiment according to FIG. 7 is particularly suitable for smaller systems. The wet solids discharge zone 7 of centrifuge 1 of FIG. 7 here projects, as can be seen in the drawing, into the interior 61 of the spray dryer.

FIG. 6 is a across-sectional view and FIG. 6a a partial longitudinal sectional view of the discharge zone for the wet solids of a further embodiment of a dewatering device according to the invention which is equipped with a stationary housing configured as a race course 64 and a plurality of clearing fingers 65 that are fastened to the rotating centrifuge drum 70 and therefore also rotate. Clearing fingers 65 brush past race course 64 leaving a narrow gap. Through discharge openings 66, transporting screw 67 constantly ejects wet solids particles which are then gripped by the hot drying gas 68 that is tangentially introduced at high speed and by the rotating clearing fingers 65. Thus the wet solids particles travel on a trajectory 71 drawn in dot-dash lines in the annular channel 64a of race course 64 on which they are pre-dried. The wet solids particles possibly adhering to the wall of race course 64 are removed by clearing fingers 65, carried along and returned to the stream of drying gas. The pre-dried wet solids particles are discharged in a tangential direction from race course 64 together with the introduced drying gas 68 as a solids laden gas stream 69 and are fed to a non-illustrated pneumatic through-circulation dryer for further drying.

It is also possible within the scope of the described invention to employ other solid bowl centrifuges such as, for example, a solid bowl screen centrifuge or a solid bowl nozzle centrifuge, instead of a solid bowl screw centrifuge for the preliminary dewatering of sludges to form a wet solid and for the atomization of the wet solids particles at the centrifuge discharge.

In summary, the following significant advantages result for the dewatering device according to the invention:
low investment costs;
simple structure;
small building required to operate it;
few peripheral devices;
high water evaporation output per unit volume of fresh sludge;
low costs per unit weight of water to be evaporated;
quick start-up and shut-down of the device;
no large storage devices are required for the end product because of its low water content;
no re-mixing of the end product with dry substances required;
flexible operation is possible;
low personnel costs;
ideal bulk material structure of the crumbly end product, therefore favorable for further processing;
specific surface area of the end product is large;
the end product leaves the apparatus cooled to 40° to 50° C.;
low dust development due to the adsorption properties of the crumbly end product;
low odor pollution due to the possibility of economic exhaust vapor washing and low temperature of the end product;
the hot combustion gases can be utilized in their entirety, thus avoiding costly spraying of the combustion gases with water;
existing sludge centrifuges can be easily retrofitted.

I claim:

1. A method of dewatering sludges, particularly sludges from sewage treatment facilities, comprising:
preliminarily dewatering a sludge by means of a solid bowl centrifuge to yield a wet solid comprised of dispersed particles of wet solids and having a residual water content ranging from about 60 weight percent to about 85 weight percent; and
removing residual water from the wet solid by contacting the wet solid with a drying gas under conditions effective to transform the wet solid into a non-sticky, flowable solid,
wherein the dispersed particles of wet solids are ejected at high speed from an outlet of the solid bowl centrifuge as a film of particles, and wherein the drying gas flows around the film of dispersed particles of wet solids and pre-dries them on their trajectory.

2. The method according to claim 1, wherein the trajectory of the ejected dispersed particles of wet solids is deflected by at least one deflection surface so that their trajectory and the duration of the influence of the drying gas thereon is extended.

3. The method according to claim 1, wherein the drying gas is comprised of one of hot air and combustion exhaust gases which have an initial temperature range from about 150° C. to about 500° C.

4. The method according to claim 1, wherein the drying gas has a flow velocity ranging from about 10 m/s to about 50 m/s.

5. The method according to claim 1, wherein the drying gas is superheated steam.

6. The method according to claim 1, wherein preliminarily dewatering provides a dry substance content up to about 35 weight percent and a residual water content of down to about 65 weight percent, and wherein removing residual water from the resulting wet solid by means of the drying gas provides a residual water content of down to about 15 weight percent and a dry substance content of up to about 85 weight percent.

7. The method according claim 1, wherein the solid bowl centrifuge has walls and has a housing which one of surrounds and axially extends the solid bowl centrifuge and wherein at least one of the walls and the housing are heated at at least those locations where the wet solid impinges thereon.

8. The method according to claim 1, wherein the dispersed particles of wet solids ejected from the solid bowl centrifuge have a size and wherein the size and the residual water content influenced thereby are controlled by controlling the number of revolutions of the solid bowl centrifuge.

9. The method according to claim 1, wherein the solid bowl centrifuge is a solid bowl screw centrifuge.

10. The method according to claim 1, wherein the solid bowl centrifuge is a solid bowl nozzle centrifuge which provides an approximately uniform, continuous discharge of wet solids.

11. The method according to claim 1, wherein the solid bowl centrifuge is a solid bowl screen centrifuge which provides an approximately uniform, continuous discharge of wet solids.

12. A method according to claim 1, wherein the drying gas flows against the dispersed particles of wet solids ejected from the solid bowl centrifuge in a direction opposite to their major direction of flight.

13. The method according to claim 1, wherein the drying gas flows around the dispersed particles of wet solids ejected from the solid bowl centrifuge in their major direction of flight.

14. The method according to claim 1, wherein the drying gas flows against the dispersed particles of wet solids ejected from the solid bowl centrifuge in a direction transverse to their major direction of flight.

15. The method according to claim 1, wherein the drying gas is circulated and, after the drying gas has washed around the dispersed particles of wet solids ejected from the solid bowl centrifuge, the drying gas is cleaned, dewatered and heated.

16. The method according to claim 15, wherein the drying gas is intermediately heated while it washes around the dispersed particles of wet solids.

17. The method according to claim 15, wherein a centrate is erected from the solid bowl centrifuge and wherein the drying gas, charged with predried, dispersed particles of wet solids, is washed with the centrate ejected from the solid bowl centrifuge.

18. The method according to claim 1, wherein the drying gas transports the predried, dispersed particles of wet solids away through a pneumatic conveying system to at least one of a separator and at least one subsequently-connected dryer which is one of a short-term dryer and a long-term dryer.

19. The method according to claim 1, wherein, while being contacted by the drying gas, the dispersed particles of wet solids are subjected to a size classification process which is dynamic and larger dispersed particles of wet solids are subjected to the drying gas for a longer period of time than smaller dispersed particles of wet solids.

20. The method according to claim 1, wherein the dispersed particles of wet solids ejected from the solid bowl centrifuge are dusted with dry dust and granulated.

21. A dewatering device for implementing the method according to claim 1, comprising:
a solid bowl centrifuge for separating a sludge-like mixture of solids and liquid to discharge separated liquid and separated wet solids from discharge ends thereof, the solid bowl centrifuge having a housing, having an inlet for intake of the sludge-like mixture of solids and liquid, having at least one outlet provided at each discharge end for separated liquid and separated wet solids, and having an ejection zone for the separated wet solids; and a spray dryer having housing walls which define a drying chamber therein, and having a dispersion member, the ejection zone for the separated wet solids being comprised of the dispersion member of the spray dryer.

22. The dewatering device according to claim 21, wherein the spray dryer is provided with a housing that is at least partly comprised of the housing of the solid bowl centrifuge.

23. The dewatering device according to claim 21, wherein the housing of the spray dryer is provided with at least one of (a) at least one additional inlet for secondary hot gas and (b) an additional inlet for dry substance fines for the purpose of granulation of dispersed particles of wet solids ejected from the solid bowl centrifuge.

24. The dewatering device according to claim 21, wherein at least one of (a) the housing wall of the spray dryer is heated and (b) the drying chamber is provided with heated walls and surfaces.

25. The dewatering device according to claim 21, wherein the drying chamber of the spray dryer has surfaces that come in contact with solids, and wherein such surfaces are provided at least in part with at least one of (a) wear protection and (b) an anti-adhesive coating.

26. The dewatering device according to claim 21, wherein the wet solids in the drying chamber of the spray dryer have a dwell period which is controlled by retention rings.

27. The dewatering device according to claim 21, wherein the housing of the spray dryer is provided with at least one of (a) metal deflection sheets and (b) metal guide sheets for the solids, with the metal sheets being arranged in such a manner that the dispersed particles of wet solids impinge on the metal sheets at a very flat angle of incidence and are deflected therefrom.

28. The dewatering device according to claim 21, wherein the spray dryer includes a discharge zone for the separated wet solids, and wherein a comminuting device is installed in the drying chamber of the spray dryer in the vicinity of the discharge zone for the wet solids.

29. The dewatering device according to claim 21, wherein the drying chamber of the spray dryer is provided with at least one switch for classifying the predried, dispersed particles of wet solids.

30. The dewatering device according to claim 27, wherein the housing of the spray dryer is provided with one of (a) scrapers and (b) vibrators in order to remove baked-on wet solids from the housing walls thereof and from the metal deflecting sheets, respectively.

31. The dewatering device according to claim 21, wherein the ejection zone of the solid bowl centrifuge is provided with at least one of (a) a plurality of discharge edges and (b) baffle elements.

32. The dewatering device according to claim 31, wherein the ejection zone includes a plurality of discharge openings including a plurality of discharge edges, and wherein at least one of the plurality of discharge edges is sheltered from the wind, is not performing an accelerating functions and is sloped with respect to centrifugal force vector (V).

33. The dewatering device according to claim 31, wherein the solid bowl centrifuge further comprises a centrifuge drum and a transporting screw, and has a discharge length, and wherein the last turn of the transporting screw upstream of the discharge edge for the wet solids has less of a slope (St2) so that the discharge length extends almost over the entire circumference of the centrifuge drum.

34. The dewatering device according to claim 28, wherein the solid bowl centrifuge comprises a centrifuge drum and wherein the comminuting device is a plurality of beater vanes attached to the exterior of the centrifuge drum.

35. The dewatering device according to claim 21, wherein the solid bowl centrifuge has an axis which is positioned in one of a horizontal position, a sloped position and a vertical position.

36. The dewatering device according to claim 21, wherein the solid bowl centrifuge is equipped with a drum which is one of (a) a solid bowl drum which is cylindrical, conical or cylindrical-conical, (b) a solid bowl screen drum and (c) a nozzle drum.

37. The dewatering device according to claim 21, wherein the spray dryer further comprises a heat exchanger integrated into the spray dryer.

38. The dewatering device according to claim 21, wherein the spray dryer further comprises a separating cyclone integrated into the spray dryer.

39. The dewatering device according to claim 21, wherein the solid bowl centrifuge includes rotating components, and wherein means for cooling the rotating components is provided in the region of the ejection zone of the solid bowl centrifuge.

40. The dewatering device according to claim 21, wherein the spray dryer further comprises at least one of (a) a tangential gas inlet and (b) a gas outlet.

41. The dewatering device according to claim 21, wherein the ejection zone includes discharge openings provided in a radial plane, and wherein the dryer housing is subdivided into an intake chamber and the drying chamber, and wherein a circular opening is defined in the partition and is disposed approximately in the radial plane of the discharge openings to surround the discharge openings while forming a narrow annular gap, and wherein hot drying gas is introduced tangentially with respect to the centrifuge drum at a location in the vicinity of the narrow annular gap effective for the hot drying gas to flow in a helical movement through the narrow annular gap into the drying chamber in the axial direction of the dryer housing.

42. The dewatering device according to claim 21, wherein the solid bowl centrifuge is overhung mounted and has a wet solids ejection zone which projects into the interior of the spray dryer.

43. The dewatering device according to claim 21, wherein the ejection zone of the solid bowl centrifuge has a diameter and has a number of revolutions per unit time which is selected to be as large as possible while providing for the best possible dispersion of the dispersed particles of wet solids.

44. The dewatering device according to claim 21, wherein, in the region of the ejection zone for the wet solids, the solid bowl centrifuge is equipped with a race course and rotating clearing fingers that brush closely past the race course and fling the wet solids that are ejected from the discharge openings in finely dispersed form into an annular, hot air channel.

45. A system for drying sludges, particularly sludge from sewage treatment facilities, comprising:

a dewatering device according to claim 21, and at least one dryer connected downstream of the dewatering device, which at least one dryer is one of a short-term dryer and a long-term dryer.

46. The method according to claim 15, wherein, before the drying gas is heated, it is mixed with fresh gas.

47. The method according to claim 17, wherein the charged drying gas is additionally washed with supplied process water.

48. The dewatering device according to claim 44, wherein the annular, hot air channel is connected to a pneumatic, through-circulation dryer.

* * * * *